United States Patent [19]

Chiotasso et al.

[11] Patent Number: 4,492,183
[45] Date of Patent: Jan. 8, 1985

[54] AUTOMATIC DISTRIBUTOR-FEEDER WITH PLURAL COMPARTMENTS FOR GRANULAR FOOD FOR DOMESTIC ANIMALS

[75] Inventors: Pierre Chiotasso; Jacques Dostes, both of Nice, France

[73] Assignee: Societe Spart, Nice, France

[21] Appl. No.: 451,239

[22] Filed: Dec. 20, 1982

[51] Int. Cl.³ .............................................. A01K 5/02
[52] U.S. Cl. ................................................... 119/51.13
[58] Field of Search ............... 119/51.11, 51.12, 51.13, 119/51.14, 56 R; 222/650

[56] References Cited

U.S. PATENT DOCUMENTS

| 3,738,328 | 6/1973 | Hoday et al. | 119/51.13 |
| 3,893,592 | 7/1975 | Friedman | 119/51.13 X |
| 3,900,007 | 8/1975 | Smith | 119/51.13 |
| 3,955,537 | 5/1976 | Yujiri | 119/51.13 |
| 4,000,719 | 1/1977 | Richards | 119/51.13 |
| 4,249,483 | 2/1981 | Sobky | 119/51.12 |

FOREIGN PATENT DOCUMENTS

| 64597 | 11/1982 | European Pat. Off. | 119/51.11 |
| 2372593 | 6/1978 | France . | |
| 2373227 | 7/1978 | France . | |

*Primary Examiner*—Robert P. Swiatek
*Attorney, Agent, or Firm*—Young & Thompson

[57] ABSTRACT

An automatic distributor-doser for dispensing pet food in granular form, comprises an inclined hopper through which the food can slide downward to the pet's feeding dish. Disposed above the hopper is a carousel-type food reservoir that rotates about a vertical axis and has plural radial compartments individually alignable with the hopper. The compartments are downwardly open, to permit automatic release of their food upon stepwise rotation of the reservoir.

2 Claims, 6 Drawing Figures

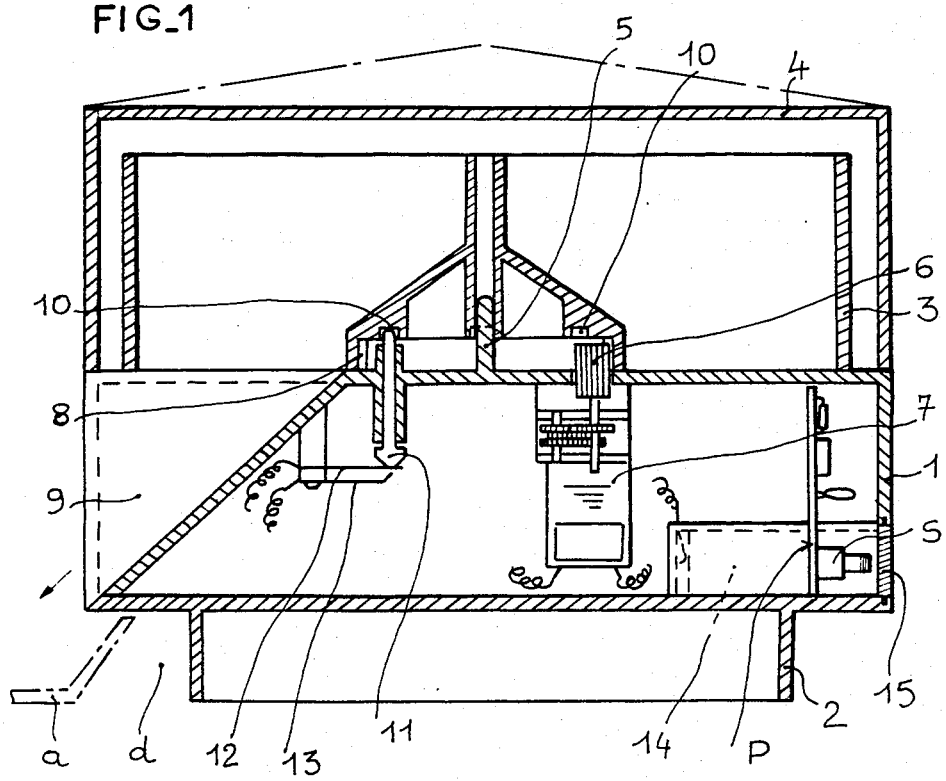
FIG_1
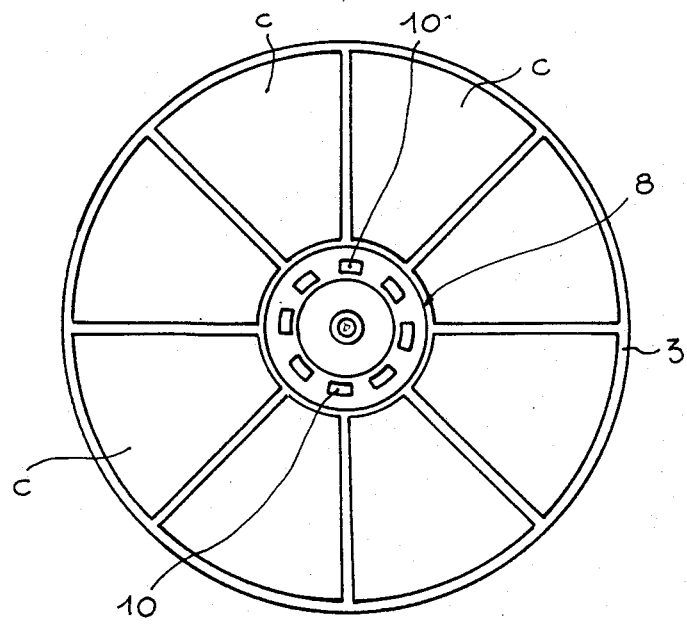
FIG_2

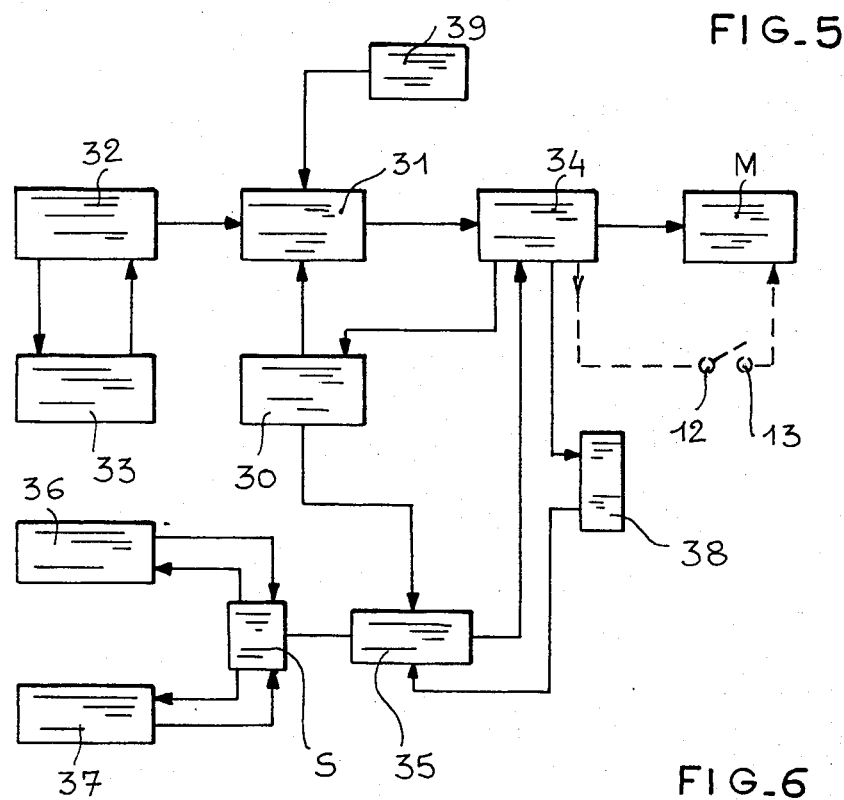
FIG_5
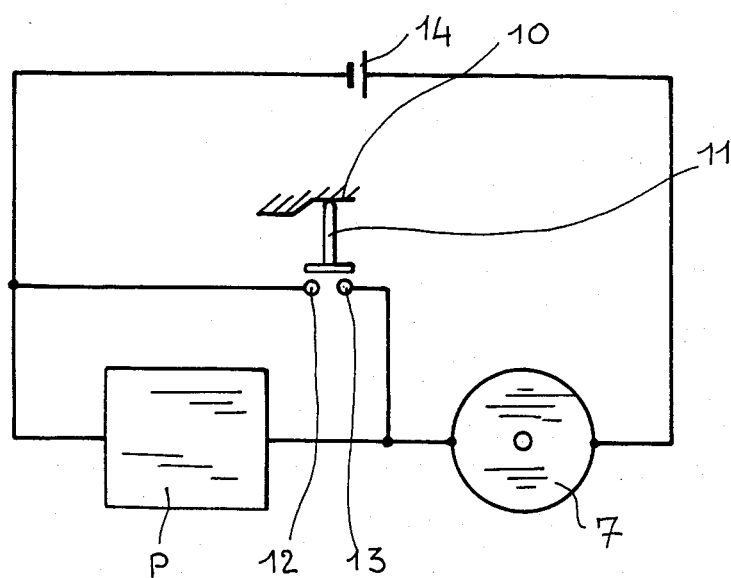
FIG_6

4,492,183

AUTOMATIC DISTRIBUTOR-FEEDER WITH PLURAL COMPARTMENTS FOR GRANULAR FOOD FOR DOMESTIC ANIMALS

The present invention relates to an automatic distributor-doser with plural compartments, for granular food for domestic animals such as cats, dogs, etc.

There exist at present a number of types of food distributors for domestic animals which serve solely as supply containers without the possibility of varying the menu. The animals help themselves as they wish.

Such a single compartment does not permit varying the menus, because there is only a single place of storage for the food. The animal actuates the flow of the food as desired. The drawback of this type of compartment resides not only in the fact that the animal always eats the same food, but also in the fact that, in the absence of the owner, either the animal does not eat at all, or else it eats too much and quickly empties the compartment and may become ill.

The state of the art is shown by the following patents: French No. 2,372,593, French No. 2,437,778, French No. 2,373,227, French No. 2,450,054, French No. 2,437,779, U.S. Pat. No. 4,000,719 and U.S. Pat. No. 3,900,007. These patents disclose structures that are too complicated to permit low cost fabrication. Moreover, this complexity, which is evident from the text and drawings of these patents, does not permit easy maintenance of the devices. The devices of these patents generally use high voltage electric feed; and it is accordingly necessary to provide numerous safety measures so as to meet all the existing standards.

The present invention avoids all of these drawbacks.

The owner of the domestic animal can prepare and load different menus for one or more meals per day. The animal thus maintains, during the absence of the owner, a much more stable life rhythm.

To this end, the automatic distributor-doser of this invention is comprised by means defining plural storage compartments whose opening is controlled by a motor actuated by a programmer. The storage means is a compartmented receptacle, open at its two ends with several sectors or recesses radiating from the center. The storage has a pin secured to the support body, whose rotation is ensured by a toothed wheel integral with the base of the center of the storage and which engages a pinion driven by a motor.

The storage comprises a circular enclosure and radial partitions but no bottom, the food resting therefore directly on the surface of the support body. The surface of the support body defines an inclined plane serving as a hopper. At a predetermined point, when the storage turns, a recess full of food will arrive opposite the inclined plane serving as a hopper; and it empties its quantity of food which falls into the subjacent receptacle for consumption by the animal. Automatic alignment means permit the receptacle always to locate a recess above the hopper. Said alignment means is comprised by a pusher which is disposed at the level of the support and which acts relative to inclined ramps provided at the level of the toothed wheel and whose arrangement permits the pusher to actuate the motor reducer in a manner to align the recess with the hopper.

The invention is characterized by the following noteworthy points:

the apparatus delivers, thanks to an electronic programmer, only the ration prepared by the owner of the animal, fed by batteries, the apparatus is self-contained and thus ensures safety and reliability, thanks to a storage divided into eight compartments, the possibility arises to vary the menus qualitatively and quantitatively, the apparatus is provided with a strong drive but consumes power only intermittently, thanks to the electronic programmer; in this way, the life of the batteries will be considerably improved, a selector permits:

(a) either to interrupt the feed of the batteries, (b) or to program the meals every 12 or 24 hours.

the alignment of the compartments is automatically performed.

The accompanying drawings, given by way of non-limiting illustrative example, permit easy comprehension of the invention, and show a preferred embodiment according to the invention.

FIG. 1 is a longitudinal cross-sectional view of the assembled apparatus.

FIG. 2 is a top plan view of the reservoir and of its storage sectors,

FIG. 5 is a circuit diagram of the electronic programmer in combination with a device for displaying the time of the first meal.

FIG. 6 is an overall wiring diagram of the device.

Figure 3:
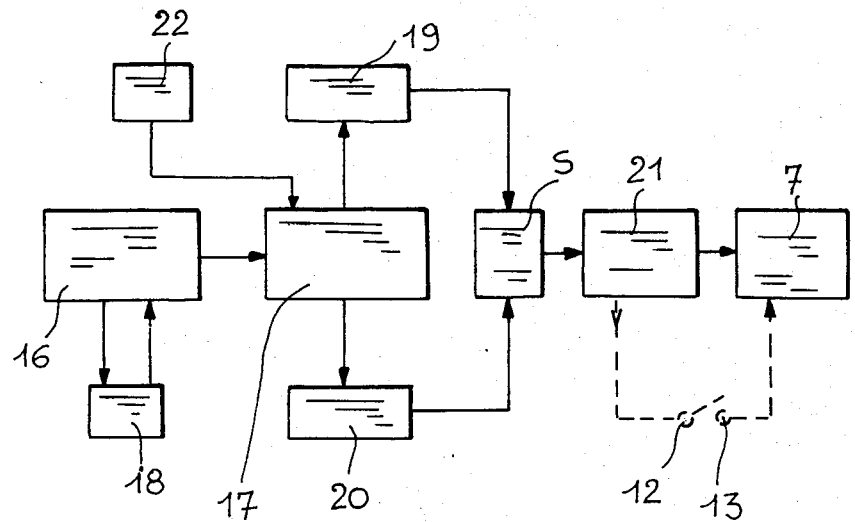
FIG. 3 is a circuit diagram of the electronic programmer P.

Referring now to the drawings in greater detail, and first to FIG. 1 thereof, there is shown apparatus according to the present invention comprising a body 1, a base 2, a reservoir 3, and a cover 4. As shown in FIG. 1, reservoir 3 has for its axle a pin 5 secured to body 1. Rotation of the reservoir is effected by pinion 6 driven by a motor 7 and a toothed wheel 8 integral with reservoir 3. Reservoir 3 is divided into eight compartments c as shown in FIG. 2, one of these compartments always being above hopper 9. When an electric impulse is emitted, every 12 or 24 hours according to the position of selector S, by the electronic programmer P, the motor turns and pinion 6, via the reduction gearing, drives reservoir 3; one of the eight cams in the form of inclined ramps 10 on reservoir 3 acts on pusher 11 which in its turn causes contact between leaves 12 and 13. These leaves 12 and 13, mounted in parallel as shown in FIG. 6 on the feed of motor 7, take the relay of the impulse emitted by electronic programmer P and permit reservoir 3 to make ⅛ of a turn corresponding to the release of a meal. Thus, when one of the compartments c is located above hopper 9, the pusher 11, by virtue of the resilience of leaves 12 and 13, is pressed back into one of the recesses between ramps 10 and thus the switch 12, 13 is opened and motor 7 is stopped.

It must be noted that the duration of the impulse emitted by programmer P is sufficient that pusher 11 can act on leaves 12 and 13 and permit reservoir 3 to complete its ⅛ turn. When reservoir 3 is replaced after having been cleaned, its positioning is automatic; thus, from the time it is put into place, reservoir 3, by virtue of its weight, acts on pusher 11. in case the latter is not opposite one of the eight inclined ramps 10, the contact between the leaves 12 and 13 is established and the motor drives the reservoir a fraction of a turn until pusher 11 falls into one of the cavities which is disposed between the inclined ramps 10.

Pusher 11 may also be used to test the proper or improper operation or the connection (reversal of the batteries) of the apparatus, or the changing of batteries 14 and the access to selector S being enabled by sliding the drawer 15 disposed opposite hopper 9.

Cover 4 precludes access by the animal to the food disposed in recesses c of reservoir 3.

Before giving a description of the electronic programmer P, it may be useful to point out that the base 2 serves as a housing for programmer P as well as the batteries 14. Sufficient space d is provided in base 2 so as to slide a tray for catching the dispensed granules.

A water supply may be connected to the apparatus without thereby modifying its operation.

FIG. 3 shows a circuit diagram of the electronic programmer P, comprised by a time base 16 which determines the interval between two impulses emitted by divider 17. Stage 18 determines the adjustment of the impulse time of stage 16, the selector S acting on stage 19 or 20 so as to predetermine the duration of the cycle of 12 or 24 hours desired by the user. The impulse received by the stage 19 or 20, according to the position of selector S, is applied to the delayed control system 21 which in its turn actuates motor 7 for a fraction of the time necessary for the automatic control to take over, which is constituted by leaves 12 and 13, so as to permit reservoir 3 to complete ⅛ of a turn and to deliver a meal.

It should be noted that, when programmer P is actuated by selector S, resetting to zero is effectuated by stage 22.

Figure 4:
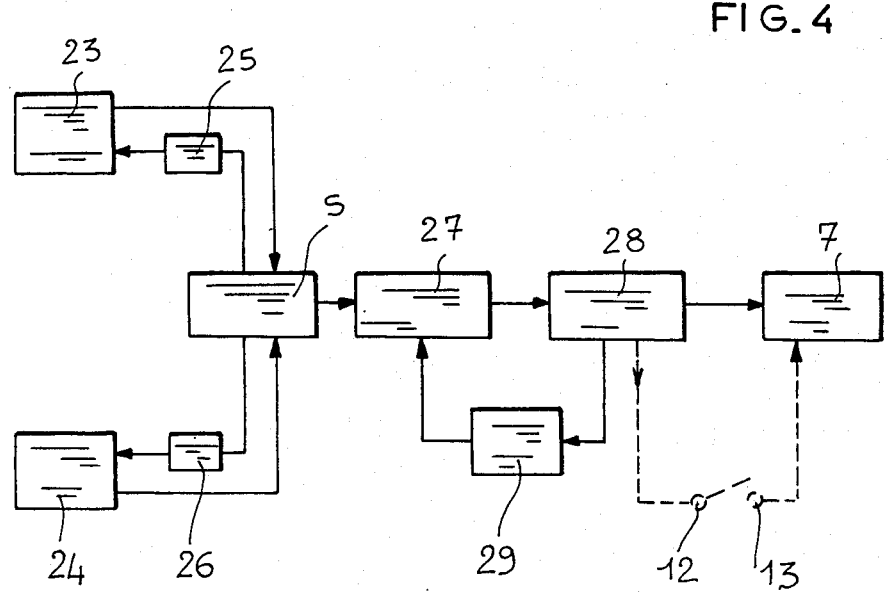
FIG. 4 is a circuit diagram of a modified form of electronic programmer.

FIG. 4 shows another embodiment of circuit diagram of electronic programmer P comprised by two time bases 23 and 24 adjusted by stage 25 and 26. S selects the stage 23 or 24 corresponding to 12 or 24 hours and applies the impulses to divider 27 which, acting as a counter, unlocks at the desired moment the delayed control system 28. The latter, which acts simultaneously on the delayed actuation of the motor and on the stage 29 which serves to reset the divider 27 to zero, the auto actuator constituted by leaves 12 and 13, as indicated in the description of the circuit diagram of FIG. 3, takes over the electric feed of motor 7.

FIG. 5 shows the circuit diagram of the electronic programmer P in combination with an electronic device which permits the display of the time for the first meal, the other meals taking place at 12 or 24 hour intervals according to the position of selector S.

Upon electrical actuation, the zero reset 39 of divider 31 will be automatically effectuated, and the delayed automatic commutator 30 will then direct the divider 31 which itself is adapted to receive impulses from its time base 32, the latter being programmed as a function of the time of delivery of the first meal by the commutator or the like 33.

Divider 31, in its role as counter, will release at the desired time, the delayed control system 34 which will act simultaneously to start the motor and will act on the delayed automatic commutator 30. This latter, under the control of system 34, will change state with a predetermined delay so as to be able to commutate the divider 35, which latter is then adapted to impulses from time base 36 by means of selector S. Divider 35, in its role of counter, will release, at the desired time, the delayed control system 34 which will act simultaneously on the starter (12 or 24 hours after the first programmed release by the commutator or adjustable member 33) of the motor M and with a predetermined delay on the zero reset 38 of divider 35. For this reason, the subsequent predetermined intervals of 12 or 24 hours will systematically be followed, according to the position of selector S.

FIG. 6 shows the general wiring diagram of the apparatus.

What is claimed is:

1. Automatic distributor-feeder for various foods comprising a reservoir (3) with plural recesses c adapted to be moved by a motor (7) actuated by a programmer, characterized by the fact that the motor is fed by batteries and consumes power only instantaneously and by virtue of the use of an electric programmer, said motor (7) driving, by a pinion (6), a central toothed wheel (8) coaxial with the reservoir (3), said toothed wheel being integral with the base of the center of the reservoir (3), and automatic aligning means (10 and 11) which permit the reservoir (3) always to stop with one of the recesses c above a hopper (9) into which the food falls from the recesses c, said aligning means comprising a pusher (11) which is disposed at the level of a support body (1) and which registers with cams in the form of inclined ramps (10) provided at the level of the toothed wheel (8) and whose arrangement permits the pusher to actuate the motor (7) so as to bring the recess c into registry with said hopper (9).

2. Automatic distributor-doser as claimed in claim 1, characterized by the fact that the feeder is at very low voltage under the control of said electronic progammer.

* * * * *